(12) United States Patent
Upadhya et al.

(10) Patent No.: US 11,671,187 B2
(45) Date of Patent: Jun. 6, 2023

(54) DETERMINING TARGET POSITIONS OF MOBILE DEVICES

(71) Applicant: Nokia Technologies Oy, Espoo (FI)

(72) Inventors: Karthik Upadhya, Espoo (FI); Martti Moisio, Klaukkala (FI); Dani Korpi, Helsinki (FI); Tero Ihalainen, Nokia (FI); Mikko Uusitalo, Helsinki (FI)

(73) Assignee: Nokia Technolgies Oy, Espoo (FI)

( * ) Notice: Subject to any disclaimer, the term of this patent is extended or adjusted under 35 U.S.C. 154(b) by 98 days.

(21) Appl. No.: 17/191,804

(22) Filed: Mar. 4, 2021

(65) Prior Publication Data

US 2021/0281336 A1    Sep. 9, 2021

(30) Foreign Application Priority Data

Mar. 6, 2020  (WO) ................. PCT/EP2020/055978

(51) Int. Cl.
*H04B 17/27*     (2015.01)
*H04B 17/373*    (2015.01)
(Continued)

(52) U.S. Cl.
CPC .......... *H04B 17/27* (2015.01); *H04B 17/373* (2015.01); *H04B 17/382* (2015.01); *H04W 64/006* (2013.01)

(58) Field of Classification Search
CPC .... H04B 17/27; H04B 17/373; H04B 17/382; H04B 17/309; H04W 64/006; H04W 64/00; H04W 4/023; H04W 4/025; H04W 4/027; H04W 4/38; H04W 24/08; H04W 28/00; H04W 28/02; H04W 28/021; H04W 28/0215; H04W 84/18; G05D 1/0094
See application file for complete search history.

(56) References Cited

U.S. PATENT DOCUMENTS

| | | | |
|---|---|---|---|
| 2019/0326981 A1* | 10/2019 | Wang | H04W 4/021 |
| 2021/0216906 A1* | 7/2021 | Flores | G06Q 10/067 |
| 2022/0124669 A1* | 4/2022 | Shen | H04W 24/10 |

FOREIGN PATENT DOCUMENTS

| | | |
|---|---|---|
| CN | 108616303 A | 10/2018 |
| JP | 2013176043 A | 9/2013 |
| JP | 2018195928 A | 12/2018 |

OTHER PUBLICATIONS

Becvar et al. "Positioning of Flying Base Stations to Optimize Throughput and Energy Consumption of Mobile Devices", IEEE., 2019, 7 pages (Year: 2019).*

(Continued)

*Primary Examiner* — Quoc Thai N Vu
(74) *Attorney, Agent, or Firm* — Harrington & Smith

(57) ABSTRACT

An apparatus and method is disclosed, in which the apparatus comprising circuitry configured for: estimating or determining a future communications state for each of a plurality a mobile devices K associated with a base station, the future communications state being indicative of the mobile device communicating in an uplink to a base station or in a downlink from the base station at a future time slot t or being idle and also determining a target position of at least one of the mobile devices, based at least partly on its estimated communication state, for enabling re-positioning of said at least one mobile device to the determined target position substantially at said future time slot t.

26 Claims, 7 Drawing Sheets

(51) Int. Cl.
    *H04B 17/382*    (2015.01)
    *H04W 64/00*     (2009.01)

(56) References Cited

OTHER PUBLICATIONS

Jiang, Feng, et al., Optimization of UAV Heading for the Ground-to-Air Uplink:, Cornell University Library, Apr. 4, 2012, 31 pages.

\* cited by examiner

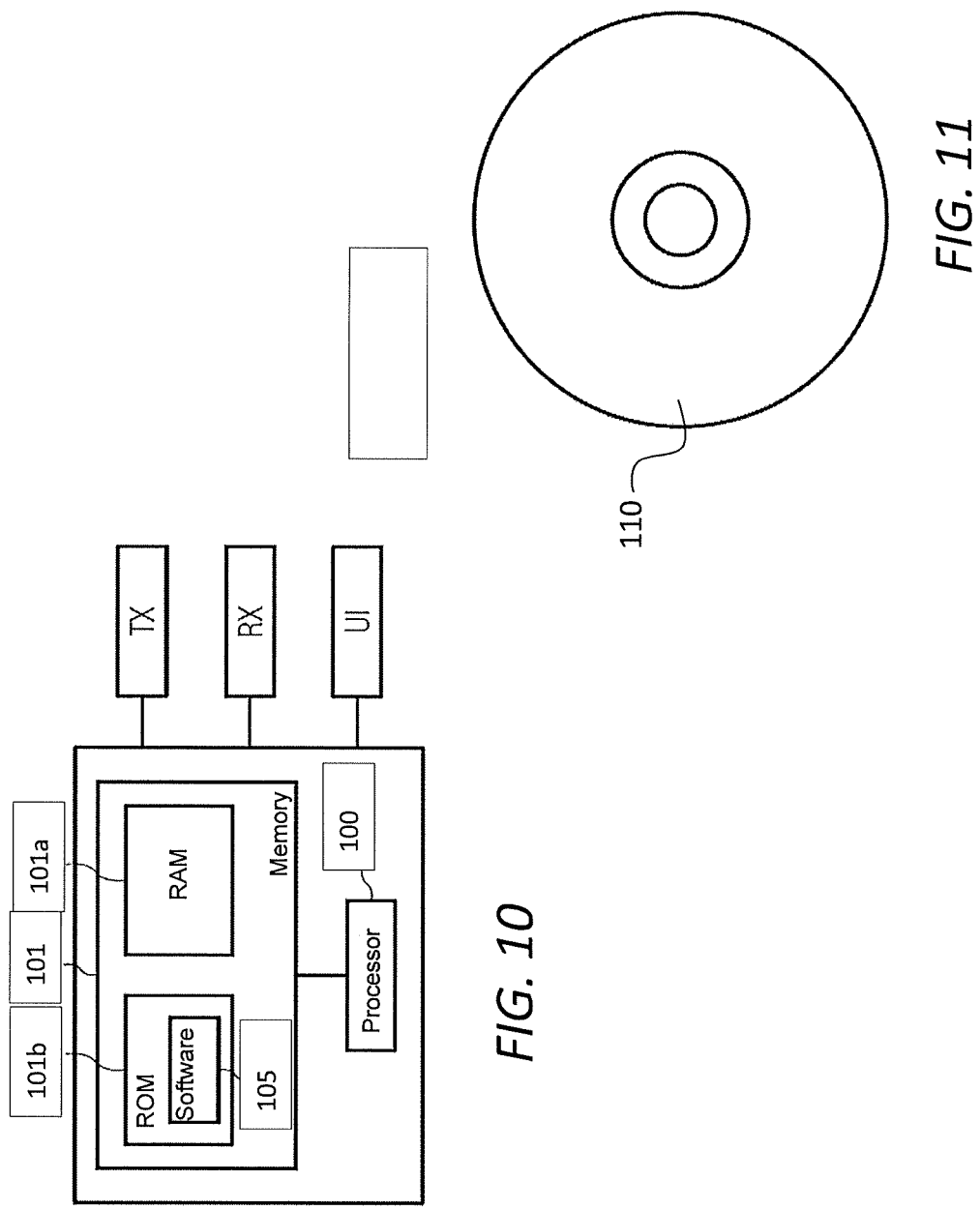

DETERMINING TARGET POSITIONS OF MOBILE DEVICES

CROSS REFERENCE TO RELATED APPLICATION

This application claims priority to co-pending international application No. PCT/EP2020/055978 filed Mar. 6, 2020 which is hereby incorporated by reference in its entirety.

FIELD

Example embodiments relate to apparatuses, methods and computer programs for determining target positions of one or more mobile devices, for example to reduce interference.

BACKGROUND

Currently, $4^{th}$ and $5^{th}$ Generation (4G, 5G) base stations (BSs) and user equipment (UEs) communicate in only one direction on a given time-frequency resource, i.e. in the uplink (UL) or downlink (DL). In-band full-duplex (IBFD) is a recent technology which has the potential to double the overall throughput by allowing both BSs and UEs to simultaneously transmit and receive over the same time-frequency resource. However, a major challenge with IBFD is self-interference (SI) which results from the stronger transmit signal interfering with the weaker received signal. Several methods exist to suppress SI, such as passive isolation, beamforming, and digital signal processing-based methods for active SI cancellation. One or a combination of these methods have been shown to reduce the SI power to close to the noise floor but may be limiting applicability for UEs given the increase in size, cost and power consumption. Some benefits of IBFD can be achieved using alternative architectures.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, example embodiments disclose an apparatus, comprising means for: estimating or determining a future communications state for each of a plurality a mobile devices K associated with a base station, the future communications state being indicative of the mobile device communicating in an uplink to a base station or in a downlink from the base station at a future time slot t or being idle or remaining idle; and determining a target position of at least one of the mobile devices, based at least partly on its estimated communication state, for enabling re-positioning of said at least one mobile device to the determined target position substantially at said future time slot t.

The determining means may be configured to determine the target position of the at least one mobile device based also on an estimated path loss associated with said mobile device for each of a plurality of future candidate positions at said future time slot t, the candidate positions being based at least partly on a current position of said mobile device.

The determining means may be configured to determine a target position for each of the K mobile devices by, for each mobile device: (i) determining a plurality of candidate positions at said future time slot t, (ii) for each said candidate position, determining a reference parameter based on the estimated future communications state and estimated path loss, and (iii) selecting as the target position the candidate position where the parameter meets a predetermined optimization condition.

The reference parameter may be representative of an average throughput of data between the mobile device at the candidate position and the base station, and the optimization condition identifies the maximum average throughput.

The future communications state of each mobile device may be expressed as a probability of the communication being in an uplink and a downlink, and wherein the average throughput is computed using the sum of the average uplink throughput and the average downlink throughput, each throughput being weighted based on the respective probabilities.

The determining means may be configured such that the estimated path loss is based on the estimated path loss at each candidate position between the mobile device and each of the one or more other mobile devices at said future time slot.

The determining means may be configured such that the estimated path loss is further based on the estimated path loss at each candidate position between the mobile device and the base station at said future time slot.

The apparatus may further comprise means for (iv) updating the current position data of each of the mobile communications devices with the respective target positions, and to re-perform, for each of one or more further future time slots t=t+1 ... T, operations (i), (ii) (iii) and (iv), for each of the mobile communications devices.

The plurality of candidate positions may be based on the current position and trajectory of the particular mobile device.

The plurality of candidate positions may comprise positions in three-dimensional space.

The plurality of candidate positions may be constrained to within a particular distance from the current position.

The apparatus may further comprise means for causing the at least one mobile communications device to move to its respective target position.

The base station may be configured for In-band full-duplex (IBFD) operation.

Each mobile communications device may comprise a half-duplex radio.

One or more of the mobile communications devices may be an unmanned aerial vehicle (UAV), autonomous and/or remotely controlled vehicle, or a mobile robot.

According to a second aspect, example embodiments disclose a method, comprising: estimating or determining a future communications state for each of a plurality a mobile devices K associated with a base station, the future communications state being indicative of the mobile device communicating in an uplink to a base station or in a downlink from the base station at a future time slot t or being idle; and determining a target position of at least one of the mobile devices, based at least partly on its estimated communication state, for enabling re-positioning of said at least one mobile device to the determined target position substantially at said future time slot t.

Determining the target position of the at least one mobile device may be based also on an estimated path loss associated with said mobile device for each of a plurality of future candidate positions at said future time slot t, the candidate positions being based at least partly on a current position of said mobile device.

Determining may comprise determining a target position for each of the K mobile devices by, for each mobile device: (i) determining a plurality of candidate positions at said future time slot t, (ii) for each said candidate position, determining a reference parameter based on the estimated future communications state and estimated path loss, and (iii) selecting as the target position the candidate position where the parameter meets a predetermined optimization condition.

The reference parameter may be representative of an average throughput of data between the mobile device at the candidate position and the base station, and the optimization condition identifies the maximum average throughput.

The future communications state of each mobile device may be expressed as a probability of the communication being in an uplink and a downlink, and wherein the average throughput is computed using the sum of the average uplink throughput and the average downlink throughput, each throughput being weighted based on the respective probabilities.

The estimated path loss may be based on the estimated path loss at each candidate position between the mobile device and each of the one or more other mobile devices at said future time slot.

The estimated path loss may be further based on the estimated path loss at each candidate position between the mobile device and the base station at said future time slot.

The method may further comprise (iv) updating the current position data of each of the mobile communications devices with the respective target positions, and to re-perform, for each of one or more further future time slots t=t+1 ... T, operations (i), (ii) (iii) and (iv), for each of the mobile communications devices.

The plurality of candidate positions may be based on the current position and trajectory of the particular mobile device.

The plurality of candidate positions may comprise positions in three-dimensional space.

The plurality of candidate positions may be constrained to within a particular distance from the current position.

The method may further comprise causing the at least one mobile communications device to move to its respective target position.

The base station may be configured for In-band full-duplex (IBFD) operation.

Each mobile communications device may comprise a half-duplex radio.

One or more of the mobile communications devices may be an unmanned aerial vehicle (UAV), autonomous and/or remotely controlled vehicle, or a mobile robot.

According to a third aspect, example embodiments disclose an apparatus, comprising at least one processor, at least one memory directly connected to the at least one processor, the at least one memory including computer program code, and the at least one processor, with the at least one memory and the computer program code being arranged to perform the method of any definition of the second aspect.

According to a fourth aspect, example embodiments disclose a computer program product comprising a set of instructions which, when executed on an apparatus, are configured to cause the apparatus to carry out the method of any definition of the second aspect.

According to a fifth aspect, example embodiments disclose a non-transitory computer readable medium comprising program instructions stored thereon for performing a method, comprising: estimating or determining a future communications state for each of a plurality a mobile devices K associated with a base station, the future communications state being indicative of the mobile device communicating in an uplink to a base station or in a downlink from the base station at a future time slot t or being idle; and determining a target position of at least one of the mobile devices, based at least partly on its estimated communication state, for enabling re-positioning of said at least one mobile device to the determined target position substantially at said future time slot t.

According to a sixth aspect, example embodiments disclose an apparatus comprising: at least one processor; and at least one memory including computer program code which, when executed by the at least one processor, causes the apparatus: estimating or determining a future communications state for each of a plurality a mobile devices K associated with a base station, the future communications state being indicative of the mobile device communicating in an uplink to a base station or in a downlink from the base station at a future time slot t or being idle; and determining a target position of at least one of the mobile devices, based at least partly on its estimated communication state, for enabling re-positioning of said at least one mobile device to the determined target position substantially at said future time slot t.

BRIEF DESCRIPTION OF DRAWINGS

Example embodiments will now be described, by way of non-limiting example, with reference to the accompanying drawings, in which:

FIG. 10 is a block diagram of an apparatus that may be configured or programmed to operate in accordance with example embodiments; and FIG. 11 shows non-transitory media that may comprise computer-readable code for operating according to example embodiments.

DETAILED DESCRIPTION

Figure 2:
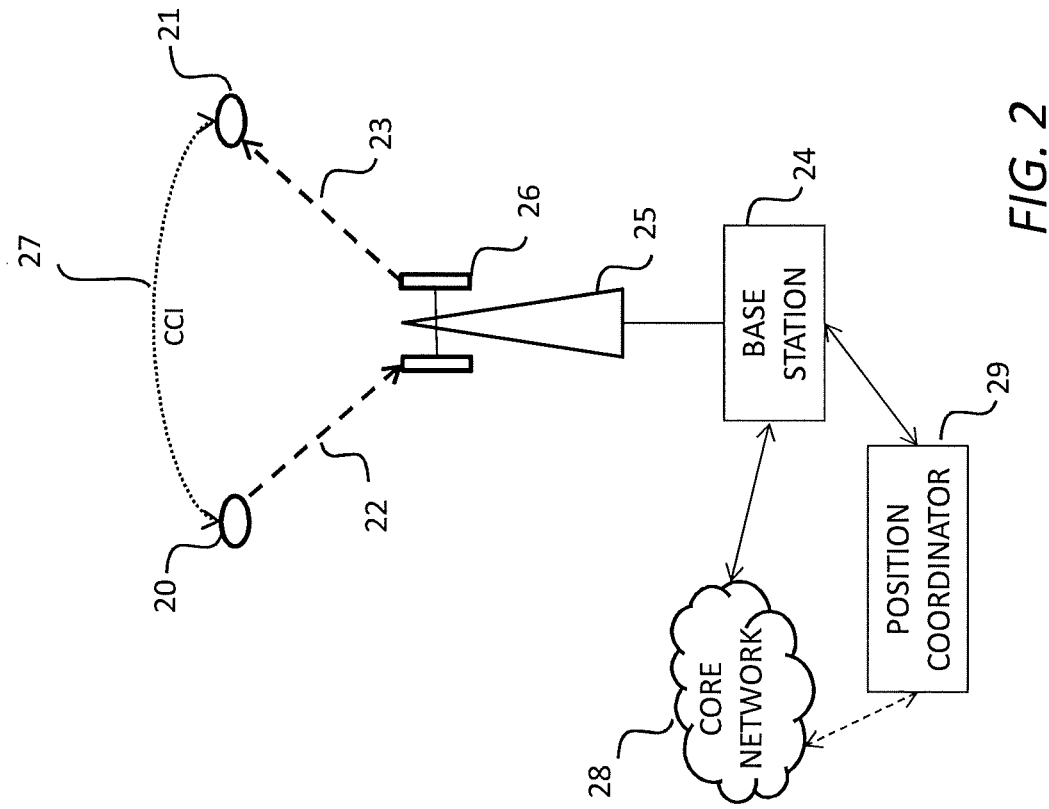
FIG. 2 is a block diagram of part of a communications network, comprising an In-Band Full-Duplex (IBFD)-capable base station and a plurality of mobile communications devices with half-duplex radios for positioning, according to example embodiments.

Example embodiments include determining target positions of one or more mobile communications devices ("mobile devices") which may or may not be user equipment (UE). A mobile device in this context may be any device capable of radio transmission and/or reception in a respective uplink and downlink, and which may change position autonomously and/or under remote control. Unmanned Aerial Vehicles (UAVs) are described herein as an example of a mobile device. Other examples include autonomous and/or remotely-controlled land vehicles and/or mobile robots carrying radio equipment. UAVs are becoming key enablers for future technologies and applications such as surveillance, cargo transport, and scientific research. It is predicted that UAV networks may become useful to developments in implementing communications networks. UAVs usually require a communications link with a base station (BS) to transmit and receive payload data, for example, sensor data from a camera and/or GNSS receiver in an uplink (UAV to BS) and control data in a downlink (BS to UAV) to determine their operation, flight path etc. In some embodiments, the control data may come from a network module other than a BS.

In-band full-duplex (IBFD) holds potential for improving data throughput in current and future radio networks, but suppressing Self Interference (SI) at a mobile device such as a UAV may increase the size, weight, cost, and power consumption of the mobile device, which limits its applicability in practice. It may be possible to realize some of the benefits of IBFD by modifying the network such that an IBFD-capable BS serves two (or two sets of) half-duplex mobile devices, one set transmitting in the uplink (UL) and the other set receiving in the downlink (DL) using the same time-frequency resource. With this type of network architecture, SI can be managed at the BS but mobile devices transmitting in the UL may still cause cross-channel interference (CCI) to mobile devices receiving in the DL using the same time-frequency resource. The magnitude of this interference will depend on the UL transmit power and path loss between the mobile devices, and the latter depends on the relative location of the mobile devices within a cell. Provided the SI is suppressed sufficiently at the IBFD-capable BS, CCI may become the major source of interference in this network architecture. CCI is also far more difficult to suppress, and doing so may necessitate coordination between the mobile devices, which in turn may require overhead that may diminish the throughput gained when moving to an IBFD-enabled BS. Where the UEs have multiple antennas (since that is the typical case in practice), the CCI magnitude may also depend on the beam directions. The term "pathloss" may include the beam gains when UEs have multiple antennas. Thus, as used herein, path loss may include consideration of beam gains where mobile devices have multiple antennas. For example, where there are mobile devices with multiple antennas, the CCI magnitude may also depend on factors such as beam directions.

Example embodiments aim to mitigate CCI in a network which may comprise an IBFD-enabled BS and a plurality of autonomous or remotely-controlled mobile devices carrying RF radios, e.g. half-duplex radios. Control includes control of the mobile device's position, and possibly speed. In the context of UAVs, position may mean its three-dimensional (3D) spatial position in X, Y and Z axes, for example.

Example embodiments may involve estimating or determining a future communications state of each of the plurality of mobile devices at one or more particular time slots in the future, for example based on communications states at current and/or prior time slots. Although the term "estimating" may be used below in this context, it is also intended to cover situations where the future communications state is known with certainty. A communications state may be indicative of the mobile device transmitting in an uplink to the BS or receiving in a downlink from the BS, and, possibly, as a further state, the BS being idle at a particular time. The future communications state may be generated as a probability or likelihood measure, e.g. 80% likelihood of transmitting in the uplink and 20% likelihood of receiving in the downlink. Where "idle" is a legitimate state, this may also have a probability measure. The result may be set to "uplink" in this case, or, as in some embodiments, the estimated probability parameters may be used to estimate data throughput at a future time. In one embodiment, a target position of at least one of the mobile devices at a future time slot may be determined based on the estimated transmission states at said future time slot, for causing re-positioning of said at least one mobile device to the determined target position, so that the mobile device is at said target position substantially at said future time. Example embodiments involve methods of determining how to reposition one or more mobile devices so that the effects of CCI can be a mitigated whilst still achieving some benefits of IBFD.

Example embodiments may provide an optimisation algorithm for determining positions of one or more mobile devices, which algorithm can be performed at any part of a radio communications network, for example at the BS, or within another node, such as in part of the local or core network. The determined positions may be used by a control module to control how and when the one or more mobile devices are re-positioned. The control module may similarly be in any part of the radio communications network, for example at the BS, or within another node. Example embodiments may also therefore involve controlling the positions of one or more mobile devices automatically to move to the target position at the appropriate time slot or just prior to said time slot. The process can be performed for multiple mobile devices in parallel or in-turn. The mobile devices may not be re-positioned until a target position is determined for the mobile devices. At, or just prior to each time slot, the mobile devices may be controlled to move to their target positions, and so on for each subsequent time slot.

Figure 1:
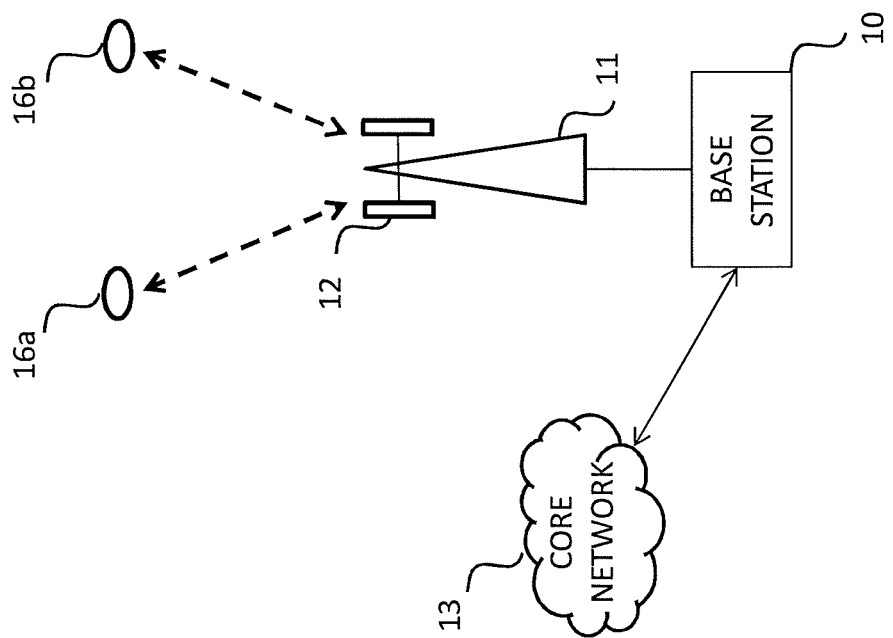
FIG. 1 is a block diagram of part of a communications network, comprising a base station in communication with a plurality of mobile communications devices.

FIG. 1 shows part of a telecommunications network comprising a BS 10 having an associated antenna mast 11 and one or more antennas elements 12 mounted thereon. The BS 10 may comprise a wireless communications transceiver, and there may be a backhaul connection to a core network 13, possibly via one or more intermediate nodes. The BS 10 and/or the core network 13 may comprise processing functionality. Data may be stored, maintained and/or manipulated at the BS 10 and/or core network 13. The BS 10 may be a ground station which has a known, fixed location. However, the term BS 10 may refer to a fixed station or a mobile station. The BS 10 may be of any suitable type, and may utilise 3G, LTE, 5G or any future radio communications standard. For example, BS 10 may be an enhanced NodeB (eNB) or a next generation NodeB (gNB). The BS 10 may be connected to the core network 13 which may be operated by a communications service provider. Other elements or modules, not shown, may be provided.

In operation, radio signals may be sent between the BS 10 (via its antenna elements 12) and each of a plurality of UAVs 16a, 16b which are given as examples of mobile devices in this case. Each UAV 16a, 16b may carry a half-duplex radio, thereby either transmitting in an UL or receiving in a DL at a given time slot, using a common frequency, or being idle. For the avoidance of doubt, as used herein, "half-duplex" means that, for a given portion of system bandwidth, the mobile device (e.g. UAV 16a, 16b) may only transmit or receive at any given time instant, and does not preclude the mobile device transmitting and receiving simultaneously in different portions of the system bandwidth. In this respect, the term "half duplex" as used herein may be considered synonymous with "in-band half-duplex". The radio signals may represent any form of data, for example payload data, sent by the UAVs 16a, 16b, in an UL to the BS 10, or received in the opposite direction in a DL. There may be one or more BSs 10 serving a single group of UAVs 16a, 16b or one BS serving the one or more UAVs. The UAVs 16a, 16b may carry sensors and may have a number of sensor capabilities to measure various parameters relating to the status of the particular UAV. For example, speed, acceleration, altitude, position, and temperature, among other parameters, may be measured. A camera is another example of a sensor, and images may be transmitted by one or more of the UAVs 16a, 16b to the BS 10 for post-processing or onward transmission.

The BS 10 may be enabled for IBFD communications using known techniques. That is, the BS 10 may be capable of communicating simultaneously in both the uplink and downlink on a given time-frequency resource to improve throughput. As mentioned, techniques for mitigating SI that may result from IBFD operation can be applied at the BS 10. Such techniques may include passive isolation, beamforming and digital signal processing.

FIG. 2 shows part of a telecommunications network utilising the architecture mentioned above. A plurality of UAVs 20, 21 are each provided with a half-duplex radio. A first UAV 20a may transmit, for example, in an UL 22 to an antenna 26 mounted on an antenna mast 25 of an IBFD-capable BS 24. A second UAV 21 may, for example, receive a DL signal 23 from the BS 24. The UL 22 and DL 23 signals may use the same time-frequency resource. With this network architecture, while SI can be managed at the BS 24, the first UAV 20 that is transmitting in the UL 22 may cause CCI interference to the second UAV 21 receiving in the DL 23. The magnitude of the CCI 27 may depend on the transmit power and the path loss between the first and second UAVs 20, 21. The path loss may be dependent on the relative locations of the first and second UAVs 20, 21. As mentioned, provided the SI is suppressed sufficiently at the BS 24, then CCI 27 may become the major source of interference in the shown network.

In example embodiments, the first and second UAVs 20, 21 may each be equipped with a single omnidirectional antenna. The BS 24 may comprise an antenna 26 with M×N antenna elements (M columns and N rows) and may transmit and receive over a number of streams, which may be equal to the number of UAVs in the network over the same time-frequency resource through spatial multiplexing.

A position coordinator 29 is shown connected to the BS 24 or, alternatively, it may be connected to the core network 28. In some embodiments, the position coordinator 29 may form part of the BS 24 or the core network 28 or may be provided within some other part of the shown network in FIG. 2. The position coordinator 29 may comprise one or more processors or controllers configured to determine a target position for one or more of the UAVs 20, 21 at future time slots, based at least on the estimated or known future communication state or states of the UAVs 20, 21. The determined target position may be sent by the position coordinator 29, or by another module, to the relevant one or more UAVs 20, 21 to cause a change in position automatically at the relevant time slot, or just before. A control module for issuing such repositioning commands may be provided as part of the position coordinator 29 or in another module of the shown network in FIG. 2. In example embodiments, target positions of one or more of the UAVs 20, 21 are determined over future time slots with the aim of minimising the CCI within the architecture of FIG. 2.

In practice, there may be a larger number (i.e. a swarm) of UAVs. A time slot should be understood to mean a generic time interval in which a UAV transmits either in the UL or receives in the DL, or may be idle. A time slot does not necessarily mean, e.g. a NR slot comprising the fourteen OFDM symbols, although it can do.

In example embodiments, target positions for one or more of the UAVs 20, 21 may be determined by utilising a traffic pattern of the mobile devices, meaning whether the particular UAV is likely to transmit in the uplink or receive in the downlink in future time-slots.

Figure 3B:
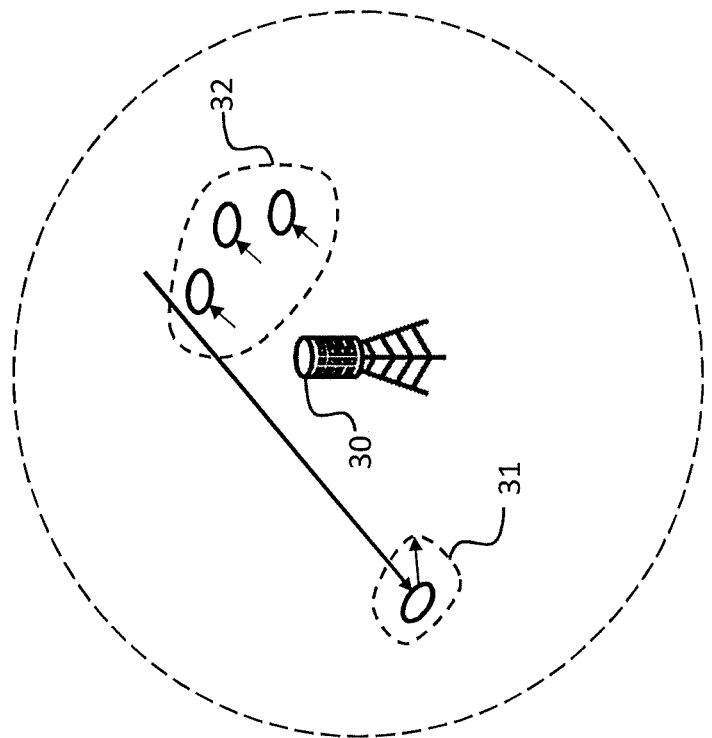
FIGS. 3A-3B are schematic views of the location of mobile communications devices in a network, respectively before and after positioning, according to example embodiments.
Figure 3A:
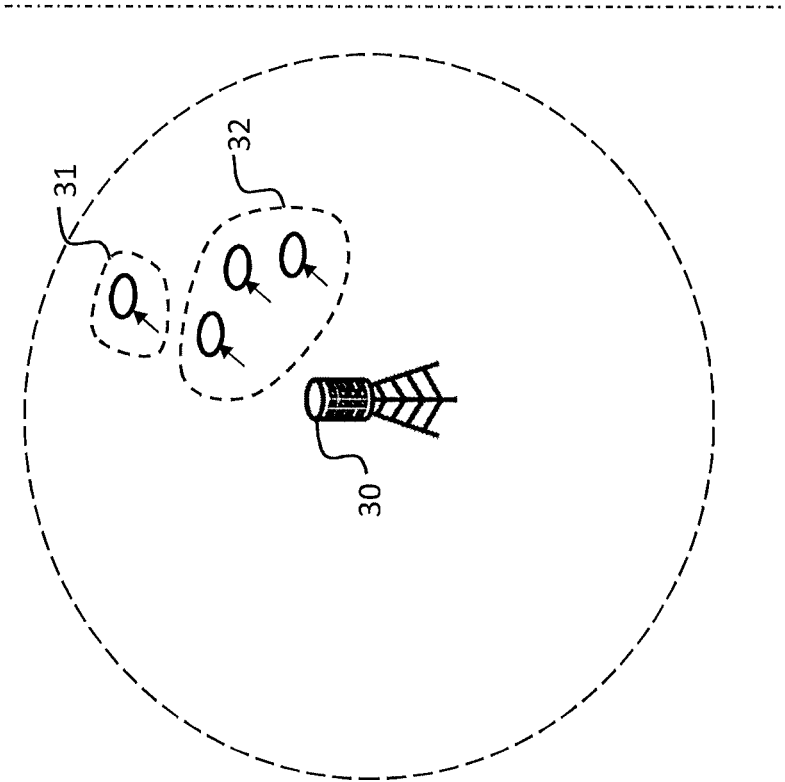

FIGS. 3A and 3B show a scenario in which the respective positions of two groups 31, 32 of UAVs are optimised by utilising the traffic pattern. The first group 31 in this case comprises only one UAV, whereas the second group 32 comprises a plurality or swarm of UAVs. The UAVs of both groups 31, 32 are each equipped with a half-duplex radio for communication with a BS 30. By utilising the traffic pattern history, e.g. whether each particular UAV has historically transmitted in the UL, received in DL or has been idle in given time slots, a probabilistic determination of a communications state for future time slots can be made using known techniques. This may involve machine learning (ML) whereby previous communications states of a given UAV can be used as training data and used to predict a future state given certain conditions.

Referring particularly to FIG. 3A, in a basic case, if it is determined that each of the second group 32 UAVs have a high probability of receiving in the DL for a future time slot, and the first group 31 has a high probability of transmitting in the UL at the future time slot, the positions of at least some of the UAVs within the two groups 31, 32 may be modified to reduce CCI. FIG. 3B shows the positions of the two groups 31, 32 of UAVs after re-positioning, as determined by position coordinator 29. The first group 31 with a high probability of transmitting in the uplink may be moved away from the second group 32 with a high probability of receiving in the downlink. This repositioning may reduce CCI by moving only the first group 31 to a position more distant to the second group 32.

By increasing the distance between the two groups 31, 32 of UAVs, the path loss between the two groups is increased and the CCI between the uplink and downlink signals is therefore reduced.

Figure 4:
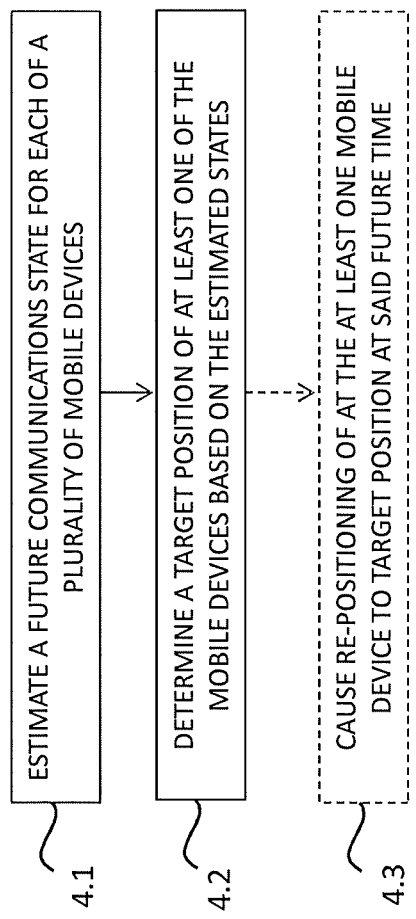
FIG. 4 is a flow diagram showing operations that may be performed according to some example embodiments.

Referring to FIG. 4, processing operations according to an example embodiment are shown in the form of a flow diagram. The processing operations may be performed in the position coordinator 29 shown in FIG. 2, for example. The processing operations may be embodied in software, hardware, firmware, or a combination thereof. For example, a computer program when executed on one or more processors or controllers may perform the processing operations.

A first operation 4.1 may comprise estimating a future communications state of each of a plurality a mobile devices. The future communications state may be defined as being indicative of the mobile device communicating in an uplink to a base station, a downlink to the base station, or, in some cases, being idle at a future time. The future communications state may be given as a probabilistic parameter.

A second operation 4.2 may comprise determining a target position of at least one of the mobile communications devices based on the estimated states for causing re-positioning of said at least one mobile device to the determined target position substantially at said future time.

In some embodiments another, third operation 4.3, may comprise causing re-positioning of said at least one mobile device to the respective determined target position(s) substantially at the future time.

Figure 5:
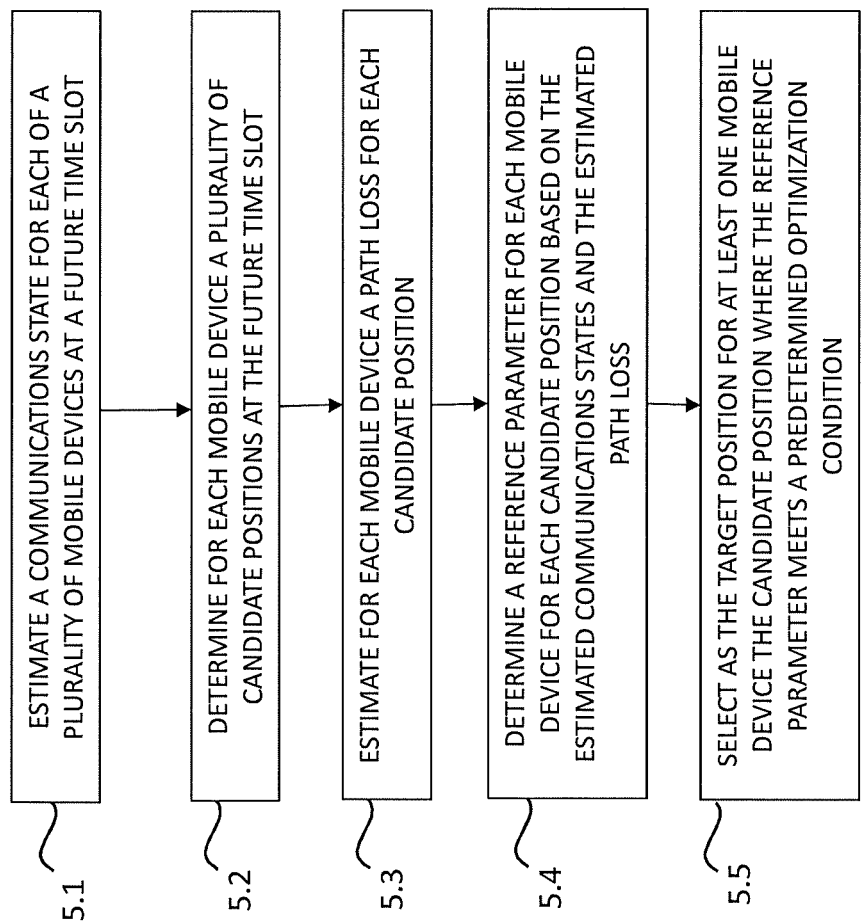
FIG. 5 is a flow diagram showing operations that may be performed according to another example embodiment.

Referring to FIG. 5, processing operations according to another example embodiment are shown in the form of a flow diagram. The processing operations may be performed in the position coordinator 29 shown in FIG. 2 for example. The processing operations may be embodied in software, hardware, firmware, or a combination thereof. For example, a computer program when executed on one or more processors or controllers may perform the processing operations.

A first operation 5.1 may comprise estimating a future communications state of each of a plurality a mobile devices at a future time slot, t. The future communications state may be defined as being indicative of the mobile device communicating in an uplink to a base station, a downlink to the base station, or being idle at a future time. The future communications state may be given as a probabilistic parameter.

A second operation 5.2 may comprise determining, for each mobile device of the plurality of mobile devices, a plurality of candidate positions at future time slot, t.

A third operation 5.3 may comprise estimating for each mobile device a path loss for each candidate position.

A fourth operation 5.4 may comprise determining, for each mobile device, a reference parameter for each candidate position based on the estimated communications states and the estimated path loss.

A fifth operation 5.5 may comprise selecting, as the target position for at least one mobile device, the candidate position where the respective reference parameter meets a predetermined optimization condition.

In example embodiments, the plurality of candidate positions determined for a mobile device at future time slot t may be based on the current position and trajectory of the particular mobile device. In other words, using knowledge of the mobile device's current position and its direction, and possibly its speed of motion, a spatial area or 3D volume may be defined within which the mobile device can move to within the relevant time slot. The trajectory of a mobile device may be determined based on the target position of the mobile device for a future time slot t. The trajectory may also be determined from information from sensors or devices associated with the mobile device, for example, speedometers, accelerometers, altimeters, RF tags, and/or cameras.

Figure 6:
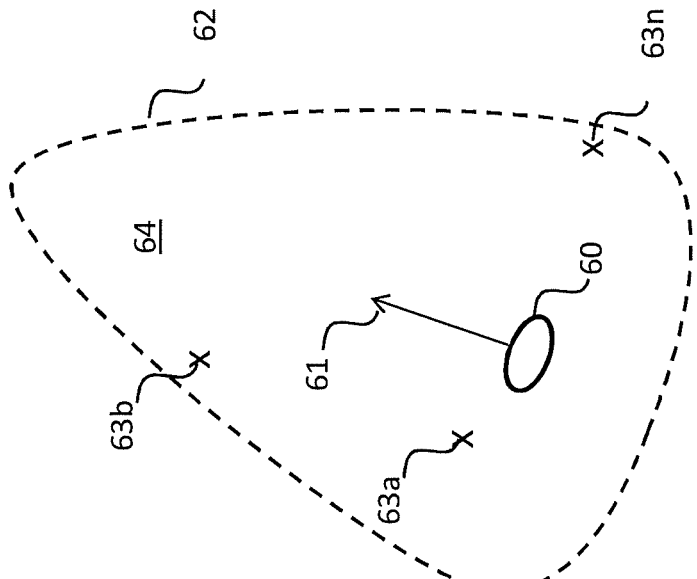
FIG. 6 is a schematic, top-plan view of a mobile communications device and a boundary containing candidate positions of said device at a future time t.

FIG. 6 shows top-plan view of a mobile device 60 having a current position and trajectory 61. Constraints on the location of said mobile device 60 at a future time slot may be defined using information indicative of its current position and trajectory 61. By defining constraints on the device location at a future time slot t, a locus corresponding to an upper bound 62 may be defined which encloses an area or volume 64 outside of which it would be impossible or unlikely for the device to travel to at the future time slot t. Therefore, a plurality of candidate positions at the time slot t may be defined within the area or volume 64. An example of a candidate position 63a is shown. A limited number of candidate positions 63a-63n, may be allocated within the area or volume 64 to limit subsequent processing. It follows that a target position of the mobile device at time slot t can be determined by selecting one the plurality of candidate positions 63a-63n.

In example embodiments, the upper bound 62 may be determined based on one or more of the maximum speed, the maximum acceleration, current position and current trajectory of the mobile device, as well as the time difference between time slot t, and the time slot associated with current position data. In some embodiments, the upper bound 62 may be determined based on a desired location, $V^{desired}$, and a vector corresponding to the upper bound of locations of the mobile device at time slot t.

In example embodiments, the position coordinator 29 may comprise means for sending, receiving and storing information indicative of the position and/or trajectory of a mobile communications device from any number of a plurality of mobile devices. Position and/or trajectory data may have associated metadata, for example, a timestamp.

In estimating or determining whether a mobile communications device will transmit, receive or stay idle in a future time-slot, including situations where one knows with certainty on whether a UE will transmit or receive or stay idle for example, a traffic prediction algorithm is used to provide a probability of such events, i.e., whether a device will transmit, receive or stay idle in that time-slot. The traffic prediction algorithm may utilise the data traffic history to predict, with an associated probability, the transmission state of a mobile communications device in any number of future time slots. Predictions can be made for any number of communications devices in a network and the predictions may be made in any node of the communications network.

In some embodiments the apparatus may comprise means for sending, receiving and storing data-traffic data from any number of a plurality of mobile communications devices. Data-traffic data may have associated metadata, for example, a timestamp.

For a path loss between pairs of mobile communications devices to be calculated, the relative positions of the respective mobile communications devices must be known. The position of each mobile communication device may be determined by GPS tracking, RF tags or any other suitable positioning technology. Positional information may be sent from any of the plurality of mobile communications devices to the base station and/or any other device.

Figure 7:
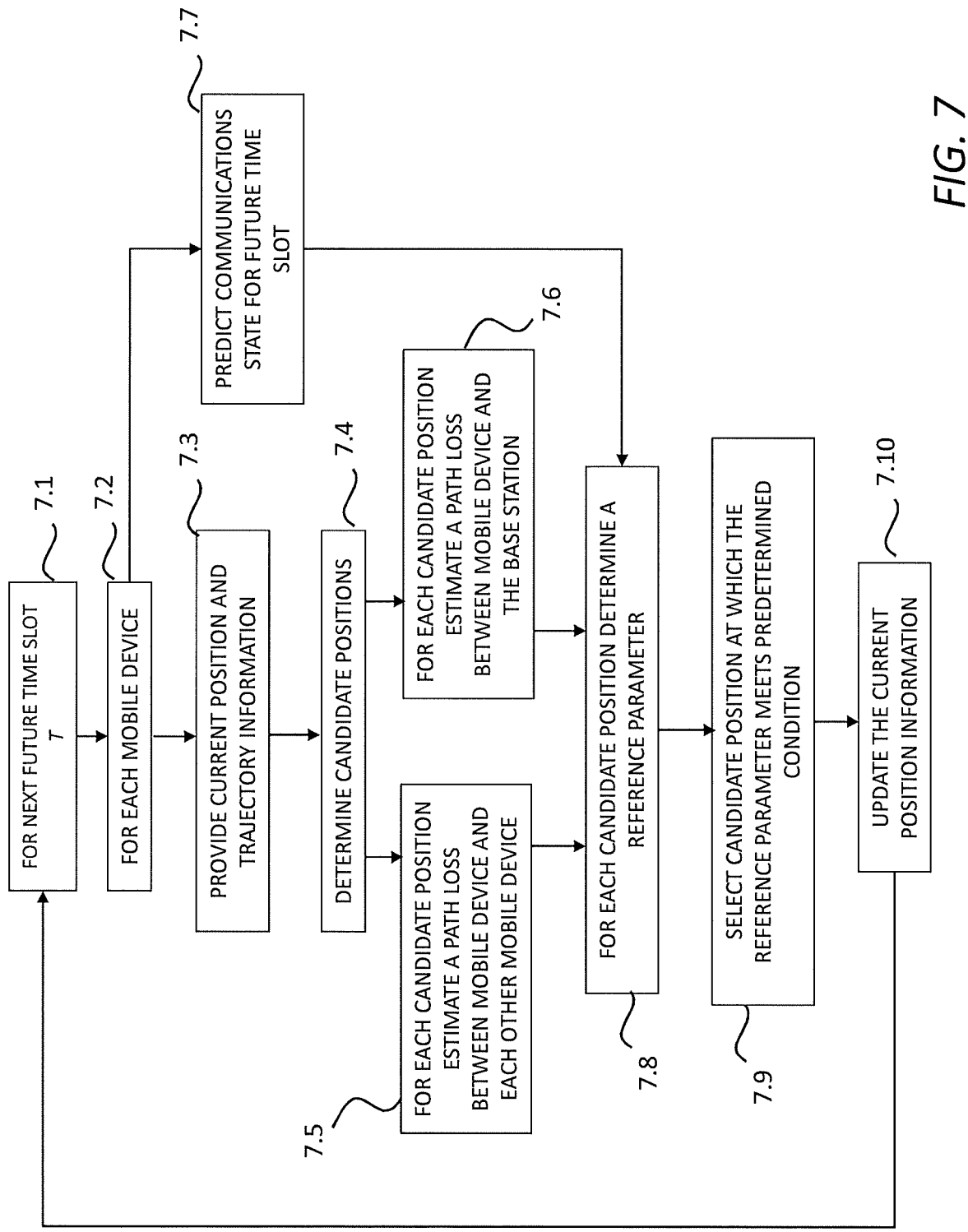
FIG. 7 is a flow diagram showing operations that may be performed according to another example embodiment.

Referring to FIG. 7, processing operations according to another example embodiment are shown in the form of a flow diagram. The processing operations may be performed in the position coordinator 29 shown in FIG. 2 for example. The processing operations may be embodied in software, hardware, firmware, or a combination thereof. For example, a computer program when executed on one or more processors or controllers may perform the processing operations.

The flow diagram of FIG. 7 gives a functional overview of an algorithm which can be put into effect using any suitable software, hardware, firmware or combination thereof. Annex A provides a mathematical derivation and further implementation details as to how the algorithm can be performed in one example.

A first operation 7.1 may comprise the start of a "for" loop for performing subsequent operations for the next (future) time slot. The operations may be repeated for each subsequent time slot for a finite number of time slots.

For the next time slot, a second operation 7.2 may comprise the start of another "for" loop for performing subsequent operations for each mobile device, either in turn or in parallel.

A third operation 7.3 may comprise providing, e.g. receiving or calculating, current position and trajectory information for the particular mobile device. Each mobile device may therefore have associated position coordinates and an associated trajectory in any suitable data format.

A fourth operation 7.4 may comprise determining a plurality of candidate positions based on the current position and trajectory information for the particular mobile device at this time slot. There may be a finite number of candidate positions.

A fifth operation 7.5 may comprise, for each candidate position, estimating a path loss between the particular mobile device at the candidate position and each other mobile device in the "swarm" at their current positions. The path loss at each candidate position may be estimated by calculating the expected value of a channel coefficient between each respective pair of mobile devices, as is indicated in Annex A.

A sixth operation 7.6 may comprise, for each candidate position, estimating a path loss between the particular mobile device and the BS. The path loss at each candidate position may be estimated by calculating the expected value of the channel coefficient between the mobile device and the BS, as is indicated in Annex A.

A seventh operation 7.7, which happens within the second operation 70.2 "for loop", and may be performed in parallel to the third to sixth operations 7.3-7.6 (but not necessarily so) may comprise predicting the communications state for the particular mobile device for the future time slot. As mentioned, this may comprise probabilistic data and may be derived on historical positions and trajectories and may make use of a machine learning model. In example embodiments, for example, the communications state of the particular mobile device may be expressed as a probability of the communication being in an UL and DL (or being idle). Therefore, for each mobile communications device, the algorithm may output a probability that the device will be in a particular transmission state (UL and DL) (or being idle) in the current time slot.

An eighth operation 7.8 may determine, using the predicted future communication state from the seventh operation 7.7, and one or more of the estimated path losses from the fifth and sixth operations 7.5, 7.6, a reference parameter. The reference parameter may be representative of a data throughput parameter. As will become clear from Annex A, the reference parameter may be representative of the average data throughput, computed using the sum of the average UL throughput and the average DL throughput, each throughput being weighted by the respective probabilities obtained from the seventh operation 7.7.

A ninth operation 7.9 may comprise selecting the candidate position as the target position based on the reference parameter meeting a predetermined condition. This predetermined condition may be reflected as an optimisation problem to determine an optimal position for each mobile device within the current time slot. For example, the predetermined condition may identify the maximum average throughput, as is explained in Annex A. Thus, the selected target position will be the candidate position at which the average throughput is maximised. Maximising the average throughput may correspond to minimising the impact of CCI and non-coherent interference, which in turn is equivalent to maximising the path loss between the mobile devices in the UL transmission state and the DL transmission state.

A tenth operation 7.10 may comprise updating the current position information for the particular mobile device, and therefore all mobile devices for the current time slot.

The process then returns to the first operation 7.1 and repeats for the next future time slot until all time slots (a finite number) are completed or, if different, a predetermined number of iterations performed. The process may therefore progress iteratively for future time slots, taking the determined target positions for the previous time slot into consideration as the new current position.

An operation of actually causing re-positioning may occur at, or just prior to, said time slot. All mobile devices may therefore be re-positioned at substantially the same time, assuming re-positioning is required of a particular mobile device. In some cases, not all mobile devices need be re-positioned. In some cases, all mobile devices may need to be re-positioned. The process repeats at the next time slot and so on. This may result in the continuous automatic movement of the mobile devices such that average throughput is maximised over the T time slots. Repositioning may be affected or caused by means of control signals issued from the position coordinator 29 shown in FIG. 2, or any other radio module that may take the target positions from the position coordinator.

The processes outlined in FIGS. 4, 5 and 7 provide methods of automatically optimising the locations of mobile devices in an IBFD capable system by, for example, maximising the path loss between mobile devices that are likely to communication in opposite directions (UL and DL) thereby minimising the CCI, as well as minimising the non-coherent interference between mobile likely to communicate in the same direction. An additional benefit of applying the methods disclosed herein in a system comprising autonomous mobile devices, e.g. UAVs, is that the positions and transmission states of the autonomous mobile devices are more efficiently and responsively controlled and predicted than in systems comprising human-operated devices.

Simulated Example

In order to illustrate benefits of the method described herein, a simulation was performed using a scenario comprising eight UAVs in line-of-sight (LoS) conditions placed in a straight line, uniformly 500 metres from BS. The magnitude of performance gains in practice may be different. The spacing between the UAVs was set at 25 metres. The BS was assumed to be equipped with 64 antenna elements and capable of fully-digital beamforming.

The UAVs were simulated for an interval of 50 time-slots, with each time-slot being of 1 second duration. In each time-slot, the UAVs are assumed to move a maximum distance of one metre from their position in the previous time-slot, which limits the maximum velocity of the UAVs to one m/sec. This is the value of S in equation (4) of Annex A.

In addition, the UAVs are assumed to move a maximum of 12.5 metres on either side of their starting locations, and this setting defines l[t] and u[t] in equation (4) of Annex A.

All UAVs are assumed able to transmit/receive in any time-slot and there is no idle UAV. In a first time-slot, the probability $p_k^{ul}[1]$ varies linearly from one for the left-most UAV to zero for the right-most UAV. The UAVs in between take values from 0 to 1. As time progresses, the left-most UAVs change from UL to DL while the right-most UAVs change from DL to UL. At the 50th time slot, the probabilities are opposite to the values in the first time-slot, i.e., $p_k^{ul}[1]$ is zero for the left-most UAV and one for the right-most UAV. The remaining UAVs have values between zero and one.

Figure 9:
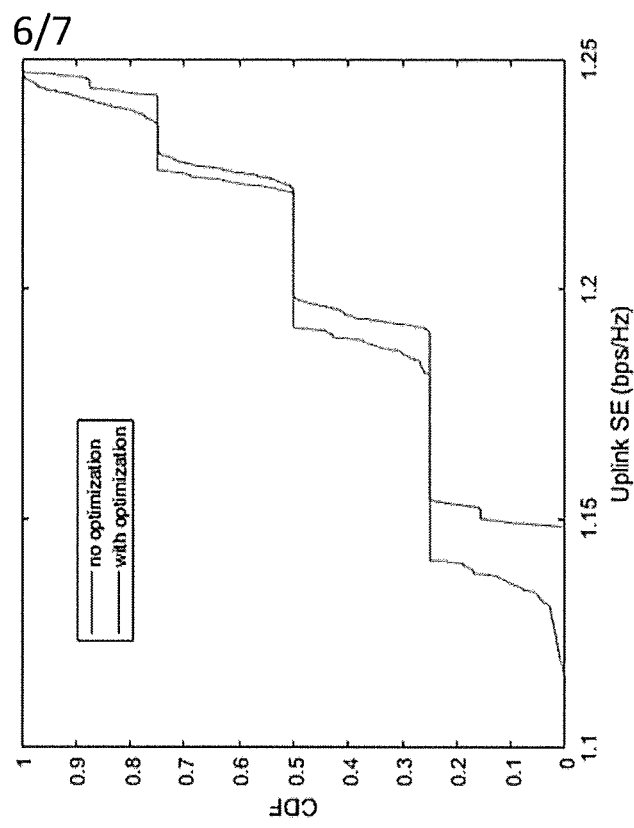
FIG. 9 is a graph showing output generated with regard to uplink performance using a simulation of the operations described herein according to an example embodiment.
Figure 8:
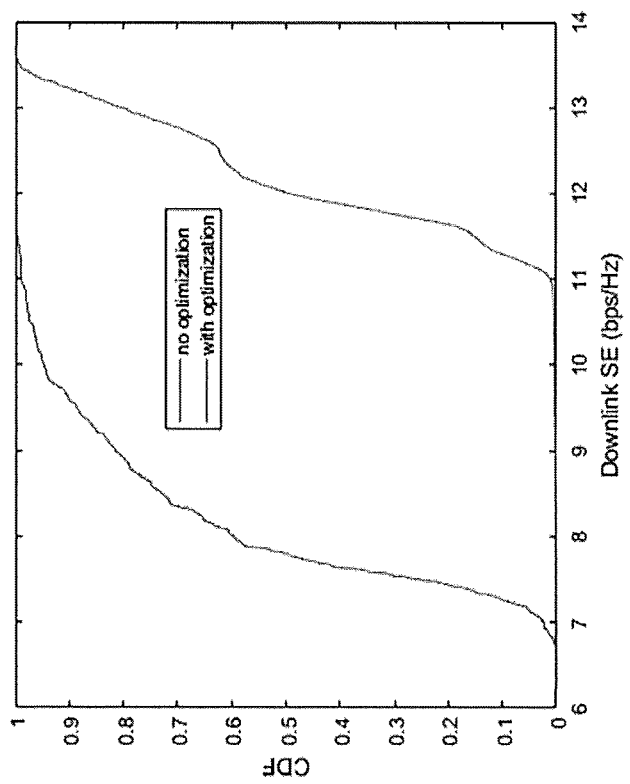
FIG. 8 is a graph showing output generated with regard to downlink performance using a simulation of the operations described herein according to an example embodiment.

FIGS. 8 and 9 show the simulated UL and DL throughputs, respectively, indicating a cumulative distribution function (CDF) against bits-per-second (or Hertz) with and without optimization.

Example Apparatus

FIG. 10 shows an apparatus according to an embodiment, which may comprise the position coordinator 29 shown in FIG. 2. The apparatus may be configured to perform the operations described herein, for example operations described with reference to any preceding process. The apparatus may also comprise, for example, part of the BS 24 or a part of the core network 28. The apparatus comprises at least one processor 100 and at least one memory 101 directly or closely connected to the processor. The memory 101 includes at least one random access memory (RAM) 101a and at least one read-only memory (ROM) 101b. Computer program code (software) 105 is stored in the ROM 101b. The apparatus may be connected to a TX path and a RX path of a base station or a mobile communications device in order to obtain respective signals. However, in some embodiments, the TX signals and RX signals are input as data streams into the apparatus. The apparatus may, optionally, be connected with a user interface (UI) for instructing the apparatus and/or for outputting results. However, instead of by a UI, the instructions may be input e.g. from a batch file, and the output may be stored in a non-volatile memory. The at least one processor 100, with the at least one memory 101 and the computer program code 105 are arranged to cause the apparatus to at least perform at least the method according to any preceding process.

FIG. 11 shows a non-transitory media no according to some embodiments. The non-transitory media no is a computer readable storage medium. It may be e.g. a CD, a DVD, a USB stick, a blue ray disk, etc. The non-transitory media 90 stores computer program code, causing an apparatus to perform the method of any preceding process.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi. Accordingly, a base station may be a BTS, a NodeB, an eNB, gNB a WiFi access point etc.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

Annex A—Formulating Optimisation Problem for Positioning Mobile Devices

Notation

The following notations are used herein:

The term "mobile device" may be used interchangeably with UE or UAV herein.

$v_k[t]$: Position vector of UE k in time-slot t. The position vector contains three components corresponding to the x, y, and z axes, i.e. $v_k[t]=[v_k^x[t], v_k^y[t], v_k^z[t]]^T$;

$h_k[t]$: Channel vector of UE k at the BS in time-slot t;

$g_{km}[t]$: Channel coefficient between UEs k and m in time-slot t;

$\alpha_k[t]$: Product of path-loss and array gain between BS and UE k in time-slot t;

$\alpha_k[t] \mathbb{E}\mathbb{E}[\|h_k[t]\|^2]$;

$\beta_{km}[t]$: Path-loss between UEs k and m in time-slot t. $\beta_{km}[t] \mathbb{E}\mathbb{E}[|g_{km}|^2]$;

$x_k^{ul}[t]$: UL data transmitted by UE k in time-slot t;

$x_k^{dl}[t]$: DL payload data transmitted to UE k in time-slot t;

$\eta_k^{ul}$: UL transmit power;

$\eta_k^{dl}$: DL transmit power;

$w_k[t]$: Precoding vector for UE k in time-slot t.

Given that the UEs are half-duplex at time instant t, a UE can be in one of three states, namely, uplink, downlink, and idle. We then define three variables $\chi_k^{ul}[t]$, $\chi_k^{dl}[t]$, $\chi_k^{idle}[t]$ to indicate the state of the UE in time-slot t. Specifically, we write:

$$\chi_k^{ul}[t] = \begin{cases} 1, & \text{UE 'k' is transmitting in the UL in time-slot } t \\ 0, & \text{otherwise} \end{cases},$$

$$\chi_k^{dl}[t] = \begin{cases} 1, & \text{UE 'k' is receiving in the DL in time-slot } t \\ 0, & \text{otherwise} \end{cases},$$

$$\chi_k^{idle}[t] = \begin{cases} 1, & \text{UE 'k' is idle in time-slot } t \\ 0, & \text{otherwise} \end{cases}.$$

The exact transmission state of a UE in a future time-slot is not known with certainty, which means that the variables $\chi_k^{ul}[t]$, $\chi_k^{dl}[t]$, $\chi_k^{idle}[t]$ and their statistics may provided by the traffic prediction algorithm. The traffic prediction algorithm provides us with $p_k^{ul}[t]=\text{Prob}(\chi_k^{ul}[t]=1)$, which is the probability that UAV k is transmitting in the UL in time-slot t. Similarly, the traffic prediction algorithm also provides the DL and idle probabilities $p_k^{dl}[t]$ and $p_k^{idle}[t]$, respectively.

Formulating the Optimization Problem

Here, we describe in detail how the UE positions may be optimized. We start by defining the received signals. The DL received signal at UE m in time-slot t can be written as:

$$r_m[t] = \underbrace{\sqrt{\eta_m^{dl}} h_m^H[t] w_m[t] x_m^{dl}[t] \chi_m^{dl}[t]}_{\text{Desired signal for UE } m} + \quad (1)$$

-continued $$\underbrace{h_m^H[t] \sum_{k \neq m} \sqrt{\eta_k^{dl}} w_k[t] x_k^{dl}[t] \chi_k^{dl}[t]}_{\text{Interference from other UEs due to spatial multiplexing}} +$$

$$\underbrace{\sum_k \sqrt{\eta_k^{ul}} g_{km} x_k^{ul}[n] \chi_k^{ul}[n] + q[t]}_{CCI}$$

where the second term in the above expression is the non-coherent interference due to spatial multiplexing and the third term is the CCI from UEs that are transmitting in the UL. Assuming that the BS has knowledge of the channel (for simplicity) and is using maximum-ratio precoding, i.e., $$w_k[t] = \frac{h_k[t]}{\|h_k[t]\|},$$

Equation (1) becomes:

$$r_m[t] = \sqrt{\eta_m^{dl}} \|h_m[t]\| \chi_m^{dl}[t] x_m^{dl}[t] +$$

$$\sum_{k \neq m} \sqrt{\eta_k^{dl}} \frac{h_m^H[t] h_k[t]}{\|h_k[t]\|} \chi_k^{dl}[t] x_k^{dl}[t] + \sum_k \sqrt{\eta_k^{ul}} g_{km} x_k^{ul}[t] \chi_k^{ul}[t] + q[t]$$

We can then obtain a lower bound on the average DL throughput for UE m in slot t as:

$$R_m^{dl}[t] = p_m^{dl}[t] \log_2 \left(1 + \frac{\eta_m^{dl} \mathbb{E}[\|h_m[t]\|^2]}{\underbrace{\sum_k \eta_k^{ul} \mathbb{E}[|g_{km}|^2] p_k^{ul}[t]}_{CCI} + \underbrace{\sum_{k \neq m} \eta_k^{dl} \mathbb{E}\left[\frac{|h_m^H[t] h_k[t]|^2}{\|h_k[t]\|}\right] p_k^{dl}[t] + \sigma^2}_{\text{Non-coherent interference+AWGN}}}\right) \quad (2)$$

The numerator in equation (2) is the desired signal power and is proportional to the product of the path-loss and the array gain of the antenna array, i.e., $\alpha_k[t] = \mathbb{E}[\|h_m[t]\|^2]$. The first term in the denominator corresponds to the CCI power and the last term is the non-coherent interference that is a combination of AWGN and inter-stream interference from spatial-multiplexing. The non-coherent interference power depends on how correlated the user channels are, which is given by their inner product $\mathbb{E}[|h_m^H[t] h_k[t] h_k[t]|^2]$, whereas the CCI power depends on the path-loss between the UL and DL UEs, i.e. on $\beta_{km}[t] \mathbb{E} \mathbb{E}[|g_{km}|^2]$.

It is straightforward to see that maximizing the throughput corresponds to minimizing the impact of CCI and non-coherent interference, which in turn is equivalent to maximizing the path-loss between the UL and DL UEs as well as minimizing the cross-correlation of their channel vectors at the BS.

Similarly, a lower bound on the average UL throughput for UE m in slot t neglecting self-interference can be obtained as:

$$R_m^{ul}[t] = p_m^{ul}[t] \log_2 \left(1 + \frac{\eta_m^{ul} \mathbb{E}[\|h_m[t]\|^4]}{\sum_{k \neq m} \eta_k^{ul} \mathbb{E}[|h_m^H[t] h_k[t]|^2] p_k^{ul}[t] + \mathbb{E}[\|h_m[t]\|^2] \sigma^2}\right) \quad (3)$$

With Equations (2) and (3), the optimization problem can be formulated as:

$$(v_{opt}[t])_{t=1}^T = \arg\max_{(v[t])_{t=1}^T} \sum_{t=1}^T \sum_{k=1}^K \left(R_k^{ul}[t] + R_k^{dl}[t]\right) \quad (4)$$

subject to $$l_k[t] \leq v_k \leq u_k[t] \forall k=[1,\ldots,K], t=[1,\ldots,T]$$

$$\|v_k[t] - v_k[t-1]\| \leq \delta \forall k=[1,\ldots,K], t=[1,\ldots,T]$$

In equation (4), the objective function of the optimization is the sum of the average throughputs of all K UEs over all T time-slots. The optimization is performed over the UE locations given by $v_k[t] = [v_k^x[t], v_k^y[t], v_k^z[t]]^T$ for all UEs $k=1, \ldots, K$ and over all time-slots $t=1, \ldots, T$.

The trajectory of the UE is determined by the first set of constraints which force the optimization algorithm to position the UE within the coordinates $l_k[t]$ and $u_k[t]$. The second set of constraints ensures that that the difference between the positions of the UE in the current and previous time-slot is less than $\delta$. This is to enforce the practical constraint that the UEs are limited in their movement across each time-slot.

In practice, we can obtain the desired location of UE k in time-slot t as $V_k^{desired}[t]$ from the trajectory information. Then, in an embodiment, given the desired location, the constraints $l_k[t]$ and $u_k[t]$ may be obtained as $l_k[t] - \epsilon$ and $u_k[t] = v_k^{desired}[t] + \epsilon$, where $\epsilon = [\epsilon_x, \epsilon_y, \epsilon_z]^T$ is a 3D vector corresponding to the range of positions around the desired UE location that the UE can take.

By optimizing the UE locations, the optimization problem in equation (4) combines knowledge of the traffic pattern, as well as the propagation channel between, to both maximize the path-loss $\beta_{km}[t] = \mathbb{E}[|g_{km}|^2]$ between two UEs that are likely to communicate in opposite directions as well as minimize the non-coherent interference between UEs that communicate in the same direction. This is described in the following algorithm.

| Algorithm to compute optimal UAV locations |
|---|
| Input: Path-loss/channel model and traffic history of all UAVs.<br>Input: The initial locations of all UAVs in the next T time-slots, i.e.,<br>set $v_k^{desired}$ [t] from the location and trajectory information for the next T time-slots.<br>Input: $\delta$, $\epsilon$, numIter<br>Initialize: Set $l_k[t] = v_k^{desired}[t] - \epsilon$ and $u_k[t] = v_k^{desired}[t] - \epsilon$ for all k = 1, ..., K and t = 1, ..., T<br>Initialize: $p_k^{ul}[t]$, $p_k^{dl}[t]$, and $p_k^{idle}[t]$ for all k = 1, ..., K and t = 1, ..., T<br>from the traffic history using a traffic prediction algorithm<br>Initialize: $v_k[t] = u_k^{desired}$ [t] for all k = 1, ..., K and t = 1, ..., T<br>--------Begin optimization--------<br>for all iteration i : 1, ..., numIter do<br>  for all time-slot t : 1, ..., T do<br>    for all UAV m : 1, ..., K do<br>      1. For all potential locations of the UAVs $v_m[t]$,<br>      obtain the quantities<br>      $\mathbb{E}\{|g_{km}|^2\}$ and $\mathbb{E}\{|h_k[t]|^H h_m [t]|^2\}$ for all k = 1,...,K, as well as<br>      $\mathbb{E}\{\|h_m[t]\|^4\}$ from the path loss/channel model<br>      2. Then, optimise over $v_m[t]$ while keeping positions of all other<br>      UEs in other time-slots constant, i.e., solve the optimization<br>      problem<br><br>$$v_m[t] \leftarrow \arg\max_v \sum_{t=1}^T \sum_{k=1}^K \left(R_k^{ul}[t]k + R_k^{dl}[t]\right)$$ |

```
Algorithm to compute optimal UAV locations subject to
        l_k[t] ≤ v ≤ u_k[t]
        ||v − v_m[t − 1]|| ≤ δ
      end for
    end for
end for
```

Solving the Optimization Problem

The optimization problem in Equation (4) is non-convex and is therefore may be difficult to solve optimally. As a workaround, a greedy coordinate descent method may be employed where, in each iteration, the position of one of the UEs in one of its time-slots is optimized while keeping the position of rest of the UEs in the remaining time-slots unchanged. Such an algorithm is simple to implement and always guarantees that the optimized positions perform better than the initial values.

What is claimed is:

1. An apparatus comprising:
    at least one processor; and
    at least one non-transitory memory storing instructions, that when executed by the at least one processor, cause the apparatus at least to perform:
        estimated or determining a future communications state for each of a plurality of mobile devices K associated with a base station, the future communications state being indicative of at least one mobile device of the mobile devices K communicating in an uplink to a base station or in a downlink from the base station at a future time slot t or being idle,
        wherein the future communications state for each of the plurality of mobile devices is expressed as a parameter indicating a probability of the future communications being in an uplink and a downlink;
        determining a target position of the at least one mobile device, based at least partly on its estimated communication state, for enabling re-positioning of said at least one mobile device to the determined target position; and
        based on the determining, controlling positions of the at least one mobile device to automatically move the at least one mobile device to the determined target position at the future time slot t or just prior to the future time slot t,
        wherein one or more of the mobile communications devices is at least one of an unmanned aerial vehicle, an autonomous controlled vehicle, a remotely controlled vehicle, or a mobile robot.

2. The apparatus of claim 1, wherein the determining is configured to determine the target position of the at least one mobile device based also on an estimated path loss associated with said mobile device for each of a plurality of future candidate positions at said future time slot t, the candidate positions being based at least partly on a current position of said mobile device.

3. The apparatus of claim 2, wherein the determining is configured to determine a target position for each of the K mobile devices by, for each mobile device:
    (i) determining a plurality of candidate positions at said future time slot t,
    (ii) for each said candidate position, determining a reference parameter based on the estimated future communications state and estimated path loss, and
    (iii) selecting as the target position the candidate position where the parameter meets a predetermined optimization condition.

4. The apparatus of claim 3, wherein the reference parameter is representative of an average throughput of data between the mobile device at the candidate position and the base station, and the optimization condition identifies the maximum average throughput.

5. The apparatus of claim 4, wherein the average throughput is computed using the sum of the average uplink throughput and the average downlink throughput, each throughput being weighted based on the respective probabilities.

6. The apparatus of claim 3, wherein the determining is configured such that the estimated path loss is based on the estimated path loss at each candidate position between the mobile device and each of the one or more other mobile devices at said future time slot.

7. The apparatus of claim 6, wherein the determining is configured such that the estimated path loss is further based on the estimated path loss at each candidate position between the mobile device and the base station at said future time slot.

8. The apparatus of claim 3, wherein the at least one non-transitory memory storing instructions is executed by the at least one processor to cause the apparatus to perform:
    (iv) updating the current position data of each of the mobile communications devices with the respective target positions, and to re-perform, for each of one or more further future time slots t=t+1 . . . T, operations (i), (ii) (iii) and (iv), for each of the mobile communications devices.

9. The apparatus of claim 2, wherein the plurality of candidate positions are based on the current position and trajectory of the particular mobile device.

10. The apparatus of any of claim 2, wherein the plurality of candidate positions comprise positions in three-dimensional space.

11. The apparatus of claim 2, wherein the plurality of candidate positions are constrained to within a particular distance from the current position.

12. The apparatus of claim 1, wherein the at least one non-transitory memory storing instructions is executed by the at least one processor to cause the apparatus to perform: causing the at least one mobile communications device to move to its respective target position.

13. A method comprising:
    estimating or determining a future communications state for each of a plurality a mobile devices K associated with a base station, the future communications state being indicative of the mobile device communicating in an uplink to a base station or in a downlink from the base station at a future time slot t or being idle,
    wherein the future communications state for each of the plurality of mobile devices is expressed as a parameter indicating a probability of the future communications being in an uplink and a downlink; and
    determining a target position of at least one mobile device of the plurality of mobile devices, based at least partly on its estimated communication state, for enabling re-positioning of said at least one mobile device to the determined target position substantially at said future time slot t;
    based on the determining, controlling positions of the at least one mobile device to automatically move the at least one mobile device to the determined target position at the future time slot t or just prior to the future time slot t,
wherein one or more of the mobile communications devices is at least one of an unmanned aerial vehicle, an autonomous controlled vehicle, a remotely controlled vehicle, or a mobile robot.

14. The method of claim 13, wherein determining the target position of the at least one mobile device is based also on an estimated path loss associated with said mobile device for each of a plurality of future candidate positions at said future time slot t, the candidate positions being based at least partly on a current position of said mobile device.

15. The method of claim 14, wherein determining comprises determining a target position for each of the K mobile devices by, for each mobile device:
(i) determining a plurality of candidate positions at said future time slot t,
(ii) for each said candidate position, determining a reference parameter based on the estimated future communications state and estimated path loss, and
(iii) selecting as the target position the candidate position where the parameter meets a predetermined optimization condition.

16. The method of claim 15, wherein the reference parameter is representative of an average throughput of data between the mobile device at the candidate position and the base station, and the optimization condition identifies the maximum average throughput.

17. The method of claim 16, wherein the future communications state of each mobile device is expressed as a probability of the communication being in an uplink and a downlink, and wherein the average throughput is computed using the sum of the average uplink throughput and the average downlink throughput, each throughput being weighted based on the respective probabilities.

18. The method of claim 16, further comprising (iv) updating the current position data of each of the mobile communications devices with the respective target positions, and to re-perform, for each of one or more further future time slots t=t+1 . . . T, operations (i), (ii) (iii) and (iv), for each of the mobile communications devices.

19. The method of claim 15, wherein the estimated path loss is based on the estimated path loss at each candidate position between the mobile device and each of the one or more other mobile devices at said future time slot.

20. The method of claim 19, wherein the estimated path loss is further based on the estimated path loss at each candidate position between the mobile device and the base station at said future time slot.

21. The method of claim 15, wherein the plurality of candidate positions are based on the current position and trajectory of the particular mobile device.

22. The method of claim 15, wherein the plurality of candidate positions comprise positions in three-dimensional space.

23. The method claim 15, wherein the plurality of candidate positions are constrained to within a particular distance from the current position.

24. The method of claim 14, further comprising causing the at least one mobile communications device to move to its respective target position.

25. A non-transitory computer readable medium comprising program instructions stored thereon for performing a method, comprising:
estimating or determining a future communications state for each of a plurality of mobile devices K associated with a base station, the future communications state being indicative of the mobile device communicating in an uplink to a base station or in a downlink from the base station at a future time slot t or being idle,
wherein the future communications state for each of the plurality of mobile devices is expressed as a parameter indicating a probability of the future communications being in an uplink and a downlink;
determining a target position of at least one mobile device of the plurality of mobile devices, based at least partly on its estimated communication state, for enabling re-positioning of said at least one mobile device to the determined target position substantially at said future time slot t;
based on the determining, controlling positions of the at least one mobile device to automatically move the at least one mobile device to the determined target position at the future time slot t or just prior to the future time slot t,
wherein one or more of the mobile communications devices is at least one of an unmanned aerial vehicle, an autonomous controlled vehicle, a remotely controlled vehicle, or a mobile robot.

26. An apparatus comprising:
at least one processor; and
at least one non-transitory memory storing instructions, that when executed by the at least one processor, causes the apparatus to at least perform:
estimating or determining a future communications state for each of a plurality a mobile devices K associated with a base station, the future communications state being indicative of the mobile device communicating in an uplink to a base station or in a downlink from the base station at a future time slot t or being idle,
wherein the future communications state for each of the plurality of mobile devices is expressed as a parameter indicating a probability of the future communications being in an uplink and a downlink;
determining a target position of at least one mobile device of the plurality of mobile devices, based at least partly on its estimated communication state, for enabling re-positioning of said at least one mobile device to the determined target position substantially at said future time slot t;
based on the determining, controlling positions of the at least one mobile device to automatically move the at least one mobile device to the determined target position at the future time slot t or just prior to the future time slot t,
wherein one or more of the mobile communications devices is at least one of an unmanned aerial vehicle, an autonomous controlled vehicle, a remotely controlled vehicle, or a mobile robot.

* * * * *